United States Patent
Liu et al.

(10) Patent No.: US 11,838,304 B2
(45) Date of Patent: Dec. 5, 2023

(54) TRACKING OF SENSITIVE DATA

(71) Applicant: International Business Machines Corporation, Armonk, NY (US)

(72) Inventors: Pei Jian Liu, Beijing (CN); Yan Liu, Beijing (CN); Bing Hua Zhao, Beijing (CN); Mei Rui Su, Beijing (CN); Na Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 17/005,501

(22) Filed: Aug. 28, 2020

(65) Prior Publication Data

US 2022/0070189 A1 Mar. 3, 2022

(51) Int. Cl.
*H04L 9/40* (2022.01)
*G06F 21/64* (2013.01)

(52) U.S. Cl.
CPC .......... *H04L 63/1425* (2013.01); *G06F 21/64* (2013.01)

(58) Field of Classification Search
CPC ............. H04L 63/1425; H04L 63/0428; H04L 2209/38; H04L 9/3247; H04L 9/3236; H04L 63/12; G06F 21/64
See application file for complete search history.

(56) References Cited

U.S. PATENT DOCUMENTS

| | | | | |
|---|---|---|---|---|
| 11,440,190 B1 * | 9/2022 | Maggi | ................. | G06F 16/9027 |
| 11,704,431 B2 * | 7/2023 | Kraus | ................. | H04L 63/0414 726/26 |
| 2013/0166703 A1 * | 6/2013 | Hammer | ............. | H04L 41/5045 709/220 |
| 2017/0063927 A1 * | 3/2017 | Schultz | ................... | H04L 63/10 |
| 2018/0005186 A1 * | 1/2018 | Hunn | ...................... | G06F 16/93 |
| 2019/0044945 A1 * | 2/2019 | Kundu | ............... | H04L 63/1408 |
| 2020/0034548 A1 | 1/2020 | Wu et al. | | |
| 2020/0313858 A1 * | 10/2020 | Feng | ...................... | G06F 21/53 |

(Continued)

FOREIGN PATENT DOCUMENTS

WO 2016094472 A1 6/2016

OTHER PUBLICATIONS

Gomes et al. "Flowverine: Leveraging Dataflow Programming for Building Privacy-Sensitive Android Applications," 2020 IEEE 19th International Conference on Trust, Security and Privacy in Computing and Communications (TrustCom) Year: 2020 | Conference Paper | Publisher: IEEE.*

(Continued)

*Primary Examiner* — Roderick Tolentino
(74) *Attorney, Agent, or Firm* — Peter J. Edwards

(57) ABSTRACT

Methods, apparatus, computer program products for tracking sensitive data are provided. A method for tracking sensitive data comprises identifying, by one or more processing units, for a type of sensitive data, at least one key interface that carries the type of sensitive data and recording the at least one key interface. The method further comprises generating, by one or more processing units, for the type of sensitive data, for each type of sensitive data, a series of service nodes based on the at least one key interface, and monitoring, by one or more processing units, for the type of sensitive data, corresponding data traffic flowing through corresponding series of service nodes, based on the identified at least one key interface.

20 Claims, 6 Drawing Sheets

(56) References Cited

U.S. PATENT DOCUMENTS

| | | | |
|---|---|---|---|
| 2020/0410314 A1* | 12/2020 | Stahlhut | G07F 7/0833 |
| 2021/0110049 A1* | 4/2021 | Kumar | G06F 21/64 |
| 2022/0044180 A1* | 2/2022 | Murao | H04L 51/046 |

OTHER PUBLICATIONS

Shin et al., "A hardware-based technique for efficient implicit information flow tracking," 2016 IEEE/ACM International Conference on Computer-Aided Design (ICCAD) Year: 2016 | Conference Paper | Publisher: IEEE.*

Pappas et al., "CloudFence: Data Flow Tracking as a Cloud Service," Computer Science Department, Columbia University, Printed Aug. 19, 2020, 20 pages, https://cs.brown.edu/~vpk/papers/cloudfence.raid13.pdf.

Carvallo et al., "Multi-cloud Applications Security Monitoring," International Conference on Green, Pervasive, and Cloud Computing, Apr. 13, 2017, pp. 748-758, https://link.springer.com/chapter/10.1007/978-3-319-57186-7_54.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

TRACKING OF SENSITIVE DATA

BACKGROUND

The present application relates to computing, and more specifically, to methods, systems and computer program products for tracking sensitive data in multi-cloud environments.

Multi-cloud is the use of two or more clouds from different cloud providers. This can be any mix of Infrastructure, Platform, or Software as a Service (IaaS, PaaS, or SaaS). For example, an organization may consume email as service from one vendor, customer relationship management (CRM) as a service from another, and Infrastructure as a Service (IaaS) from yet another. Multi-cloud may be utilized to address specific business requirements or to avoid the limitations of a single-vendor cloud strategy. For example, if all IT services of an organization are standardized on a single cloud vendor or approach, it would be difficult to switch to a different vendor that offers a better platform for application development and more competitive prices later. And, if the vendor the organization is locked into has an outage, it will affect the whole environment. Multi-cloud provides the flexibility to quickly adopt the best technologies for any task.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products tracking sensitive data in multi-cloud environment are described.

One example embodiment provides a method for tracking sensitive data, comprising identifying, by one or more processing units, for a type of sensitive data, at least one key interface that carries the type of sensitive data and recording the at least one key interface. The method further comprises generating, by one or more processing units, for the type of sensitive data, for each type of sensitive data, a series of service nodes based on the at least one key interface, and monitoring, by one or more processing units, for the type of sensitive data, corresponding data traffic flowing through corresponding series of service nodes, based on the identified at least one key interface.

Another example embodiment provides a system for tracking sensitive data. The system comprises a memory medium comprising program instructions and a processor for executing the program instructions, when executing the program instructions causes the system to identify, for a type of sensitive data, at least one key interface that carries the type of sensitive data and record the at least one key interface, generate, for the type of sensitive data, a series of service nodes based on the at least one key interface; and monitor, for the type of sensitive data, corresponding data traffic flowing through corresponding series of service nodes, based on the identified at least one key interface.

A further example embodiment provides a computer program product for tracking sensitive data, comprising a non-transitory computer readable storage having program codes embodied therewith, the program codes comprising program codes to identify, for a type of sensitive data, at least one key interface that carries the type of sensitive data and record the at least one key interface; program codes to generate, for the type of sensitive data, a series of service nodes based on the at least one key interface; and program codes to monitor, for the type of sensitive data, corresponding data traffic flowing through corresponding series of service nodes, based on the identified at least one key interface.

These and other features and advantages will be described in, or will become apparent to those of ordinary skill in the art in view of, the following detailed description of the example embodiments of the present invention.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
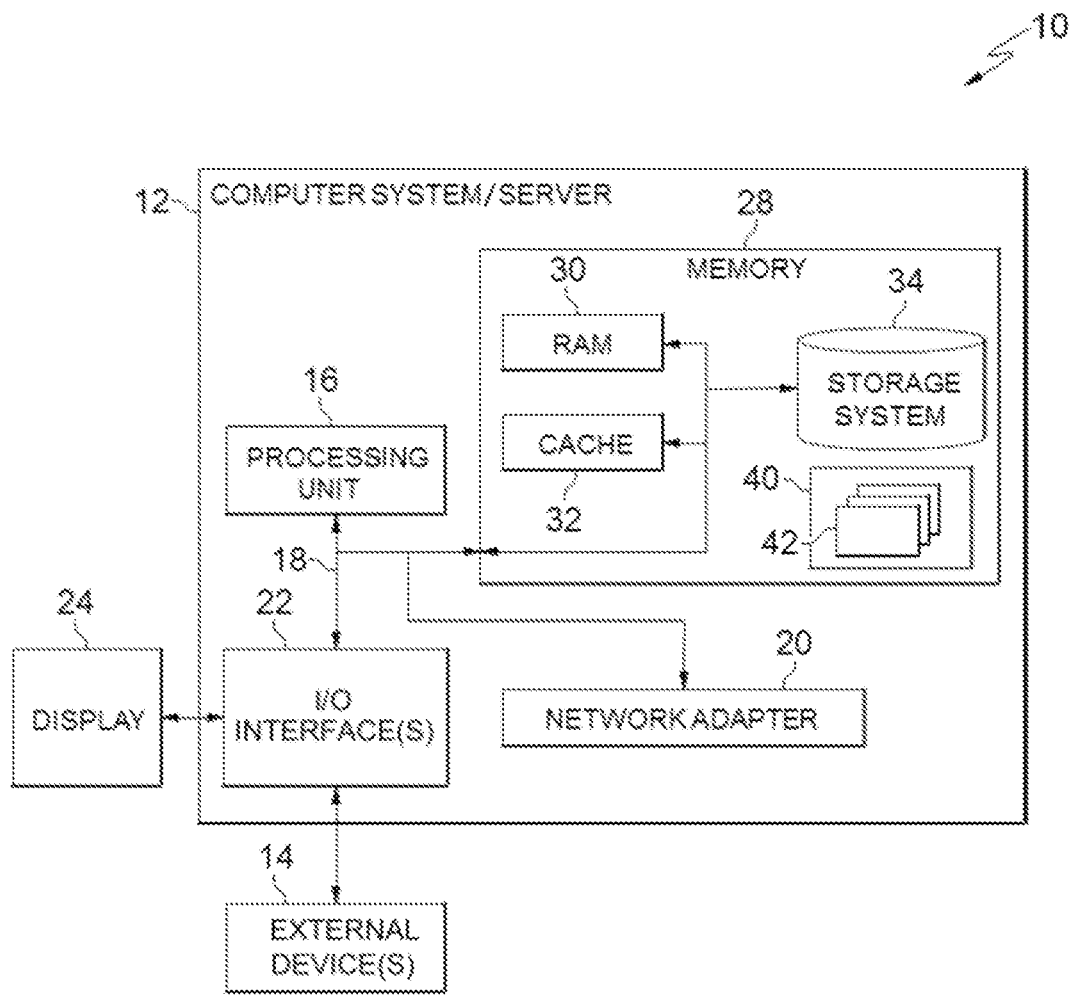
FIG. 1 depicts a cloud computing node according to an embodiment of the present disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, consistent with several embodiments of the present disclosure. Cloud computing node 10 is only one example of a suitable cloud computing node and is not intended to suggest any limitation as to the scope of use or functionality of embodiments of the present disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
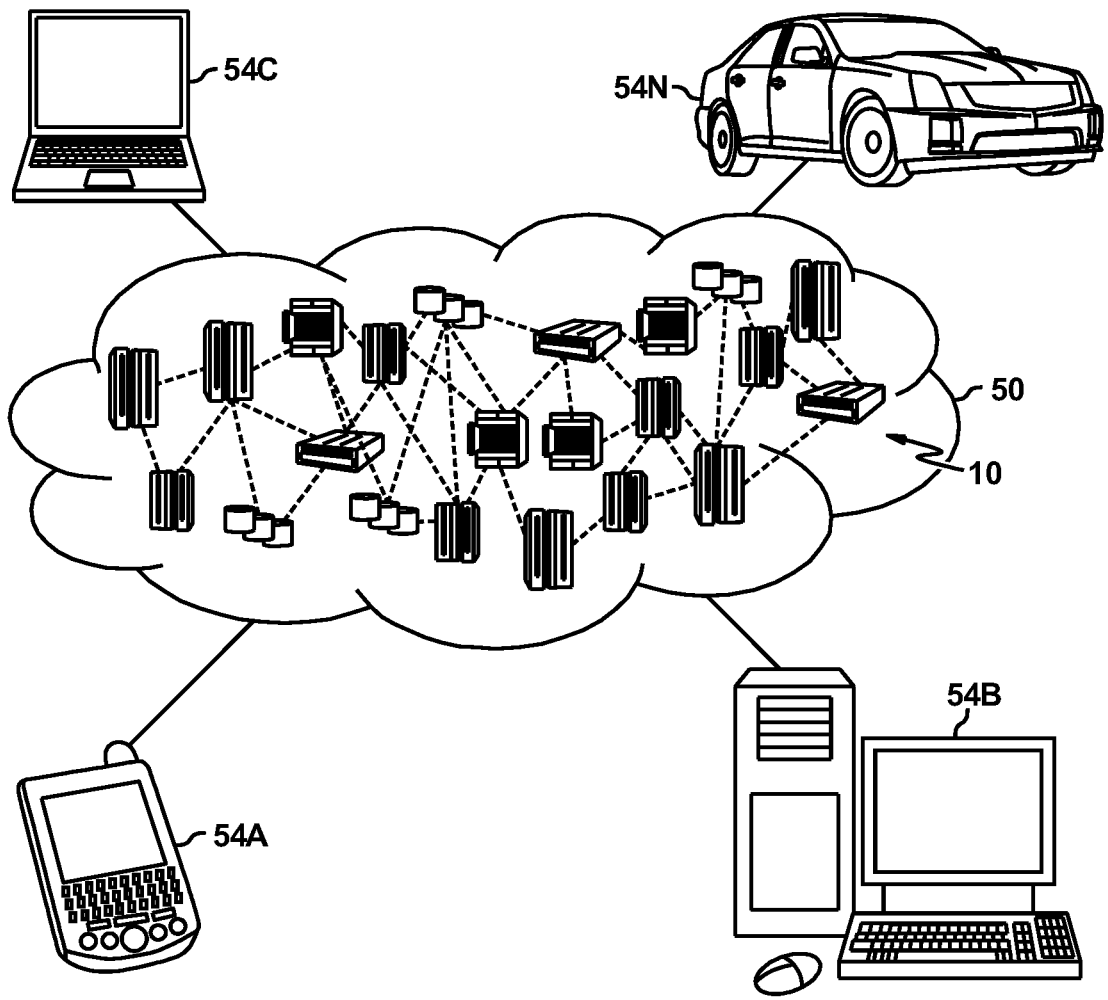
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
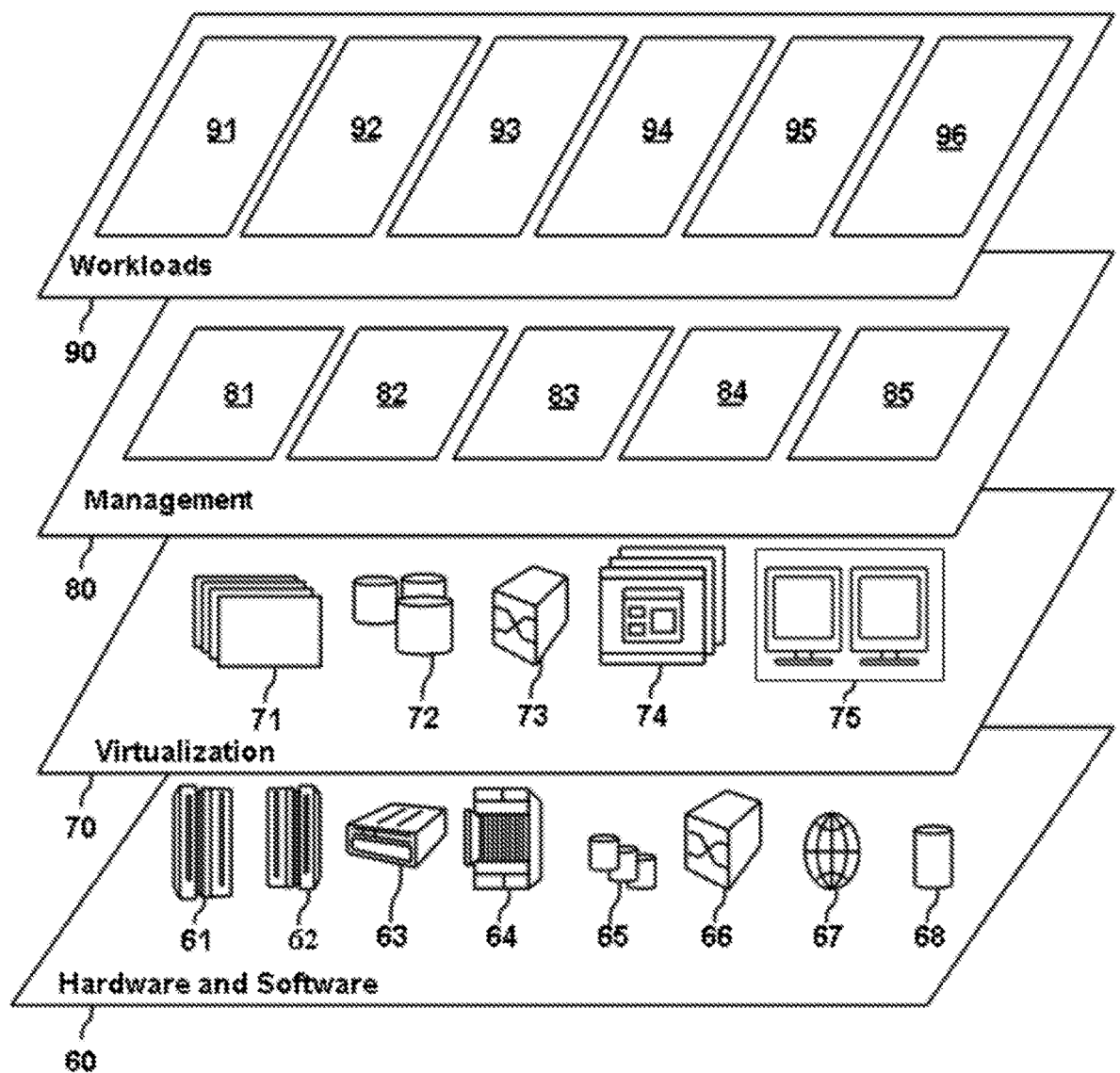
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and sensitive data tracking 96 according to embodiments of the invention.

As mentioned above, multi-cloud environments have become a future trend of cloud computing for several reasons (for example, they can provide flexibility to enable clients to quickly adopt best technologies while avoiding many limitations of a single-vendor cloud strategy). However, the complexity of managing different technologies from different vendors remains a significant obstacle. With the development of different laws and regulations governing the handling of sensitive data in different jurisdictions, e.g., General Data Protection Regulation (GDPR) of European Union, tracking of sensitive data becomes more and more important. However, the complexity of managing different technologies from different vendors in multi-cloud environments brings difficulties in tracking of sensitive data. Embodiments of the present disclosure address the issue of tracking of sensitive data in question, especially in multi-cloud environments.

Figure 4:
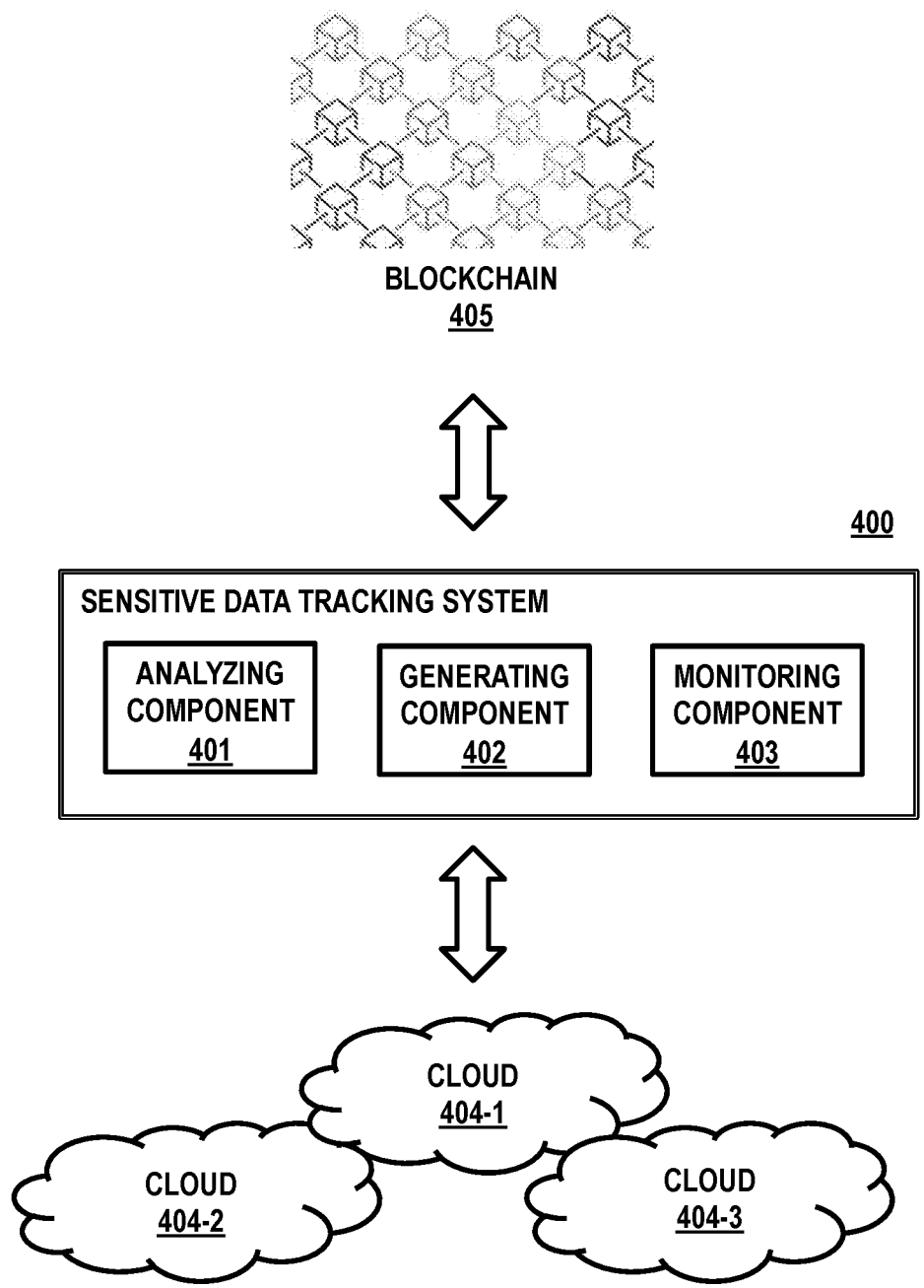
FIG. 4 depicts a block diagram of an example sensitive data tracking system consistent with several embodiments of the present disclosure.

FIG. 4 depicts a block diagram of an example sensitive data tracking system 400 consistent with several embodiments of the present disclosure. Example sensitive data tracking system 400 comprises an analyzing component 401, a generating component 402 and a monitoring component 403. The sensitive data tracking system 400 is connected to a multi-cloud environment that comprises cloud 404-1, cloud 404-2 and cloud 404-3. The multi-cloud environment includes a number of service nodes (not shown in FIG. 4; described in further detail with reference to FIG. 6, below), where each service node is provided by one of clouds 404-1, 404-2 and 404-3. Each of clouds 404-1, 404-2 and 404-3 may be provided by different cloud service providers. As an illustrative example, cloud 404-1 may be provided by IBM CLOUD, cloud 404-2 may be provided by AMAZON WEB SERVICES (AWS) by AMAZON, and cloud 404-3 may be provided by ALIBABA CLOUD by ALIBABA. Different cloud service providers may adopt different technologies. Thus, in a multi-cloud environment that utilizes multiple cloud service providers, technologies adopted on different service nodes may be different, depending on the technologies adopted by the respective service providers. In one example, cloud 404-1 provided by IBM CLOUD utilizes KUBERNETES technologies while cloud 404-2 provided by AMAZON utilizes DOCKER technologies. The handling of data in service nodes in cloud 404-1 may thus utilize different interfaces compared with service nodes in cloud 404-2. Although the three different clouds 404-1 through 404-3 shown in FIG. 4 may each have a difference cloud provider, fewer or more cloud service providers may exist in a multi-cloud environment.

In some embodiments, the analyzing component 401 is configured to analyze each service node in the multi-cloud environment to identify at least one key interface that carries a certain type of sensitive data. As used herein, "sensitive data" refers to any data identifiable and transmitted through any interfaces of a service node that need attention, which may be defined by its provider. For example, a data provider may define several attributes of the data it provides as a certain type of sensitive data, and any data involving the defined attributes may be deemed as the type of sensitive data. A key interface refers to an interface that handles any type of sensitive data. For example, if an interface relays a certain type of data identified as sensitive, the interface will be identified as a key interface for the type of sensitive data. In some embodiments, for a certain type of sensitive data, the analyzing component 401 may issue instructions to respective service nodes in the multi-cloud environment, instructing respective service nodes to retrieve information needed to identify at least one key interface for the type of sensitive data. Service nodes receive the instructions issued by the analyzing component 401, retrieve the information needed to identify the at least one key interface for the type of sensitive data and send the information retrieved to the analyzing component 401. The analyzing component 401 then receives the information from service nodes and based on which, identifies the at least one key interface for the type of sensitive data. The details of how to identify the key interface(s) for a certain type of sensitive data are discussed in further detail below.

In some embodiments, information received from a service node may be fed to a neural network which was trained with training datasets comprising respective types of sensitive data and corresponding respective interfaces in service nodes that are labeled as key interfaces carrying the respective types of sensitive data. The training datasets may comprise information such as, for example, information about a certain type of the sensitive data (which may be defined by a data provider), information about interfaces, information about key interface(s) corresponding to the type of sensitive data, etc. Information about a certain type of the sensitive data may comprise attributes of the type of sensitive data that can be identified, including but not limited to, for example, data format, data length, data description, etc. Information about interfaces may comprise, for example, an identifier (for example, information to uniquely locate an interface), a direction (for example, whether the interface is an input interface with data flowing in, or an output interface with data flowing out), a type (for example, how data is processed by an interface), a persistence status (for example, whether data persists after passing through an interface), etc. Information about key interface(s) corresponding to the type of sensitive data may include, for example, an identifier (for example, information to uniquely locate a key interface), a direction (for example, whether the key interface is an input key interface with the type of sensitive data flowing in, or an output key interface with the type of sensitive data flowing out), a type (for example, how the type of sensitive data is processed by a key interface), a persistence status (for example, whether the type of sensitive data persists after passing through a key interface), etc.

The above information in each type of information comprised in a training dataset is merely an example; less or more information may be included. Further, the training of the neural network with above mentioned training datasets may adopt any current approaches or those developed in the future. Details of how to train the neural network are omitted for sake of brevity. After the training of the neural network is completed, it may be utilized to identify key interface(s) in service nodes for a certain type of sensitive data.

Similarly, in some embodiments, information received from a service node may comprise, for example, information about a certain type of the sensitive data (which may be defined by a data provider) and/or information about interfaces in the service node. Information about a certain type of the sensitive data may comprise attributes of the type of sensitive data that can be identified, such as, for example, data format, data length, and data description, etc. Information about interfaces in the service node may include an identifier (for example, information to uniquely locate an interface), a direction (for example, whether the interface is an input interface with data flowing in, or an output interface with data flowing out), a type (for example, the way an interface used to process data), a persistence status (for example, whether data persists in the service node after passing through an interface), etc. The received information is then fed to the neural network coupled to the analyzing component 401 (trained beforehand as mentioned above), where at least one key interface corresponding to the type of the sensitive data is identified.

In some embodiments, the identified one or more key interfaces corresponding to the type of sensitive data is recorded by the analyzing component 401. In some embodiments, the recorded identified one or more key interfaces includes information comprising, but not limited to, an identifier of a service node that the at least one key interface belongs to (for example, information to uniquely locate a service node), an identifier of the identified at least one key interface (for example, information to uniquely locate a key interface), a direction of the at least one key interface (for example, whether the at least one key interface is an inputting key interface that the type of sensitive data flows in, or an outputting key interface that the type of sensitive data flows out), a type of the at least one key interface (for example, the way to process the type of sensitive data in the at least one key interface), a persistence status of the at least one key interface (for example, whether data is persisted in a service node after passing through the at least key interface) and etc. It should be pointed out, less or more information mentioned above may be recorded by the analyzing component 401. In some embodiments, the recorded information about the at least one key interface may be stored, in any format, to any location accessible by the sensitive data tracking system 400.

Figure 6:
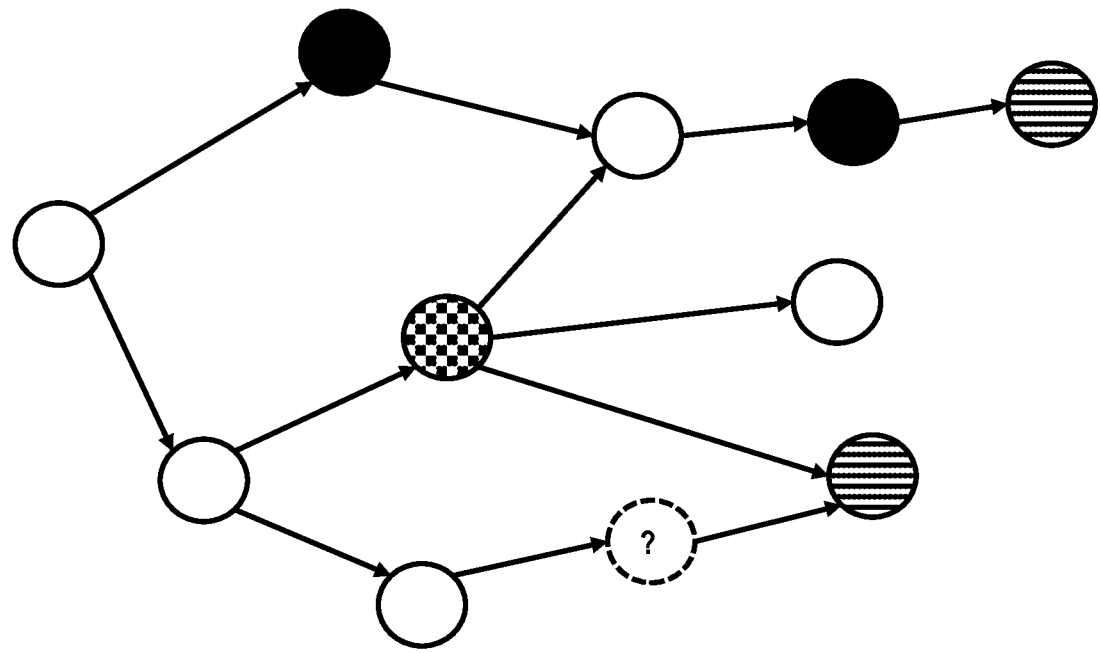
FIG. 6 depicts a series of service nodes represented by a direct graph, consistent with several embodiments of the present disclosure.

In some embodiments, the generating component 402 may retrieve the recorded information about the at least one key interface from any location with the recorded information stored, and generate, based on the retrieved information, a series of service nodes for the type of sensitive data. The series of service nodes for the sensitive data represents routes that the type of sensitive data flows in the multi-cloud environment. In some embodiments, the series of service nodes may be represented with a directed graph with nodes in the graph representing service nodes and edges in the graph representing the direction of the type of sensitive data in question flowing in the graph (service nodes). In FIG. 6, a series of service nodes generated are depicted as a directed graph, as described above. In FIG. 6, different styles of circles represent service nodes belonging to different cloud service providers. For example, as shown in FIG. 6, circles with solid white color represent service nodes belong to cloud service provider A, circles with solid black color represent service nodes belong to cloud service B, circles with stripe pattern represent service nodes belong to cloud service provider C, and circles with mosaic pattern represent service nodes belong to cloud service provider D. The circle of dashed line and a question mark inside of it represents those service nodes that are not shown for the sake of brevity. Edges (arrows) in the directed graph in FIG. 6 represent the direction the type of sensitive data flowing in the graph (service nodes). It should be pointed out that the directed graph in FIG. 6 is merely an example of the representation of the series of service nodes for a type of sensitive data generated by the generating component 402 based on the information of the at least one key interface, the series of service nodes may be represented in any suitable formats/structures. Also, it should be pointed out that although the directed graph in FIG. 6 represents only one series of service nodes for one type of sensitive data, with some modification or adaption, the directed graph in FIG. 6 may represent more than one series of service nodes for more than one type of sensitive data, e.g., using different types of representations for edges (for example, arrows of dashed lines, arrows of double dashed lines, and etc.) to represent respective directions for different types of sensitive data flowing in the directed graph.

In some embodiments, the series of service nodes for the type of sensitive data generated by the generating component 402 may comprise respective identifiers of service nodes that the at least one key interface belongs to and are used to uniquely locate respective service nodes in the multi-cloud environment. In some embodiments, for the type of sensitive data, recorded key interfaces may be aggregated by the generating component 402 to generate the series of service nodes for the type of sensitive data. In some embodiments, the series of service nodes for the type of sensitive data generated by the generating component 402 may comprise respective identifiers of key interfaces, which are used to uniquely locate respective key interfaces in service nodes. In some embodiments, the series of service nodes for the type of sensitive data generated by the generating component 402 may further comprise, for each service node in the series of service nodes, respective relationship(s) between at least one inputting key interface for the type of sensitive data and at least one outputting key interface for the type of sensitive data, which are used to indicate respective directions that the type of sensitive data flowing through respective key interfaces in service nodes. In some embodiments, the series of service nodes for the type of sensitive data generated by the generating component 402 may further comprise, for each service node in the series of service nodes, respective ways to process the type of sensitive data, which are used to indicate the ways that respective interfaces process the type of sensitive data. In some embodiments, the series of service nodes for the type of sensitive data generated by the generating component 402 may further comprise, for each service node in the series of service nodes, respective persistency status for the type of sensitive data, which are used to indicate whether the type of data are persisted by respective service nodes after flowing through respective interfaces. It should be pointed out that information comprised in the series of service nodes described above is merely an example, fewer or more types of information may be comprised. In some embodiments, the series of service nodes for the type of sensitive data may be stored, in any format, to any location accessible by the sensitive data tracking system 400.

Referring back to FIG. 4, in some embodiments, the monitoring component 403 of the sensitive data tracking system 400 is configured to monitor, for each type of sensitive data, corresponding data traffic flowing through the corresponding series of service nodes for the type of sensitive data based on the identified at least one key interface. As discussed in the above, information comprised in a series of service nodes for a type of sensitive data may indicate the service nodes in the multi-cloud environment, the type of sensitive data flowing through (respective identifiers of service nodes that the at least key interface belongs to), the direction that the type of sensitive data flows through each service node in the series of service nodes (respective relationship(s) between at least one inputting key interface for the type of sensitive data and at least one outputting key interface for the type of sensitive data), the ways that the type of sensitive data is processed in each service node in the series of service nodes (respective ways to process the type of sensitive data), or even the persistence status of the type of sensitive data in each service node in the series of service nodes (respective persistency status for the type of sensitive data). With respective series of service nodes for a certain type of sensitive data generated by the generating component 402, sensitive data of the type may be monitored by the monitoring component 403. The monitoring component 403 may retrieve a series of service nodes for the type of sensitive data and track the type of sensitive date based on the series of service nodes. In some embodiments, for different types of sensitive data, different series of service nodes corresponding to the different types of sensitive data may be generated by the generating component 402 and be used by the monitoring component 403 to track the different types of sensitive data.

Referring again to FIG. 4, the sensitive data tracking system 400 is further coupled to a blockchain 405 as shown in FIG. 4. In some embodiments, the blockchain 405 includes multiple nodes that communicate with each other. The blockchain 405 includes an append-only immutable data structure resembling a distributed ledger capable of maintaining records between mutually untrusted parties. The immutable, append-only aspects of the blockchain 405 serve as a safeguard to protect the integrity, validity, and/or authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

In some embodiments, for a certain type of sensitive data, the monitoring component 403 may collect corresponding data traffic flowing through each service node in the series of service nodes generated by the generating component 402 for the type of sensitive data (via respective key interfaces). Then the collected data traffic is encrypted using a one-way algorithm by the monitoring component 403. The encrypted results of the collected data traffic are then sent to the blockchain 405 and stored there. The use of one-way algorithm is to ensure the encrypted results cannot be decrypted so as to ensure the contents of the collected data cannot be revealed. Any type of one-way algorithm may be adopted to encrypt the collected data traffic.

In some embodiments, in order to easily retrieve the collected data from the blockchain 405, a corresponding index may be created by the monitoring component 403 for the encrypted results of the collected data traffic for the type of sensitive data so that the encrypted results may be easily retrieved using the created corresponding index. The creation of the corresponding index and the retrieval of encrypted results using the created corresponding index may be performed through standard techniques. In some embodiments, an encrypted result retrieved by using the created corresponding index is compared with a result generated with the same data and the same one-way algorithm provided by the provider of the type of sensitive data to determine whether there is a match. An alert may be issued to the provider of the type of sensitive data if the two results do not match.

System 400 may utilize blockchain 405 in order to benefit from the immutable, append-only, tampering-proof features of blockchain technologies, which may be beneficial for usage in scenarios where these features are needed (such as, for example, GDPR compliance). However, blockchain 405 may be omitted in other scenarios.

Figure 5:
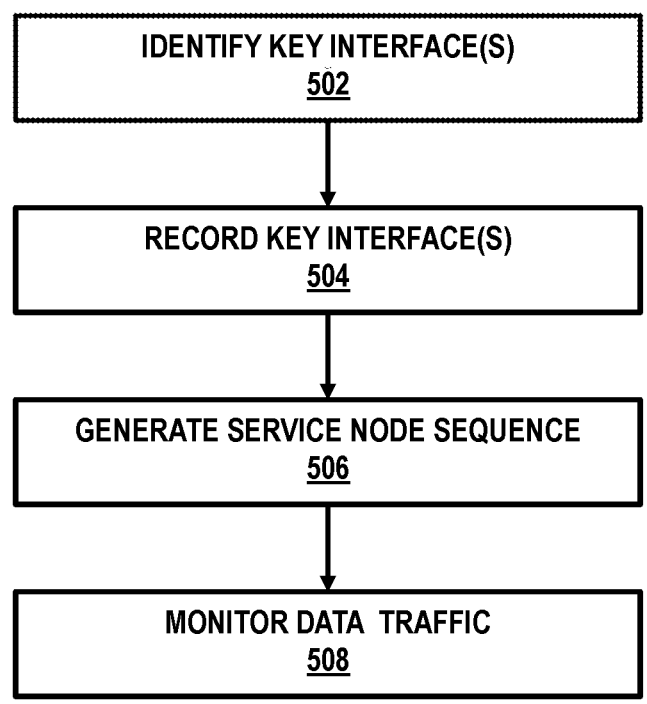
FIG. 5 is a high-level flowchart of an example sensitive data tracking method, consistent with several embodiments of the present disclosure.

FIG. 5 is a high-level flowchart of an example sensitive data tracking method 500, consistent with several embodiments of the present disclosure. Method 500 includes identifying one or more key interfaces (for each type of sensitive data) at operation 502. Method 500 further includes recording key interfaces at operation 504. Operation 504 may include, for example, recording the key interfaces using an analyzing component such as analyzing component 401 of FIG. 4. Here, sensitive data may refer to any data identifiable and transmitted through any interfaces of a service node that need attention, which may be defined by its provider. For example, a data provider may define several attributes of the data it provides as a certain type of sensitive data, and any data involving the defined attributes may be deemed as the type of sensitive data. A key interface refers to an interface that handles any type of sensitive data. For example, if an interface passes through/relays a certain type of data identified as sensitive, it will be identified as a key interface for that type of sensitive data. The details of how to identify a key interface are omitted for the sake of brevity, as they have been described in the above. In some embodiments, for each type of sensitive data, respective ways to process data of that type in each service node of the corresponding series of service nodes are further identified. In some embodiments, for each type of sensitive data, respective relationships between at least one inputting key interface and corresponding at least one key outputting interface in each service node in the corresponding series of service nodes are further identified. In some embodiments, for each type of sensitive data, respective data persistence status in each service node in the corresponding series of service nodes are further identified.

Method 500 further includes generating service node sequences at operation 506. Operation 506 may be performed by, for example, generating component 402 of FIG. 4. Operation 506 may include, for example, generating a series of service nodes for each type of sensitive data based on the at least one key interface. In some embodiments, the series of service nodes may be generated by aggregating, for each type of sensitive data, corresponding recorded key interfaces. In some embodiments, generated respective series of service nodes may be represented by respective directed graphs.

Method 500 further includes monitoring data traffic at operation 508. Operation 508 may include, monitoring, for each type of sensitive data, corresponding data traffic flowing through corresponding series of service nodes. The data traffic may be monitored based on the identified at least one key interface. Operation 508 may be performed by, for example, monitoring component 403.

In some embodiments, for each type of sensitive data, corresponding data traffic flowing through each service node in the corresponding respective series of service nodes are collected. The collected data traffic is then encrypted using a one-way algorithm and the encrypted results are then stored on a blockchain.

In some embodiments, for each type of sensitive data, a corresponding index for the encrypted result(s) may be created, with which the collected data traffic may be retrieved in the future.

FIG. 6 depicts a series of service nodes represented by a direct graph 600, consistent with several embodiments of the present disclosure. Graph 600 depicts tracking and associating cloud computing nodes with their respective providers. By tracking a certain type of sensitive data defined by its provider, the sensitive data tracking system can track the data traffic of the sensitive data using a series of service nodes generated utilizing the approaches described above, each of which is with one or more key interfaces that carries the sensitive data, it is easy to track whether the handling of sensitive data in the multi-cloud environment in question is GDPR compliance. For example, if it is tracked that the node in the farthest right (illustrated as a circle with stripe pattern) handling the sensitive data is outside the border of European Union, it can be determined that sensitive data being transmitted to that farthest-right node from the node immediately to the left (illustrated as a circle with solid black color) violates the GDPR.

It should be noted that the sensitive data tracking according to embodiments of this disclosure could be implemented by computer system/server 12 of FIG. 1.

Embodiments of the present invention may be a system, a method, and/or a computer program product at any possible technical detail level of integration. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for tracking sensitive data in a multi-cloud environment, comprising:
   identifying, by one or more processing units, for a type of sensitive data, at least one key interface that carries the type of sensitive data;
   recording, by the one or more processing units, for the type of sensitive data, the at least one key interface;
   generating, by the one or more processing units, for the type of sensitive data, a series of service nodes based on the at least one key interface, wherein each service node in the series of service nodes is provided by a different cloud provider; and
   monitoring, by the one or more processing units, for the type of sensitive data, corresponding data traffic flowing through each node in the corresponding series of service nodes, based on the identified at least one key interface.

2. The method of claim 1, further comprising identifying, by the one or more processing units, respective ways to process the type of sensitive data in each service node in the corresponding series of service nodes.

3. The method of claim 1, further comprising identifying, by the one or more processing units, for the type of sensitive data, at least one respective relationship between at least one inputting key interface and corresponding at least one key outputting interface in each service node in the corresponding series of service nodes.

4. The method of claim 1, further comprising identifying, by the one or more processing units, for the type of sensitive data, respective data persistence status in each service node in the corresponding series of service nodes.

5. The method of claim 1, wherein the generating a series of service nodes for each type of sensitive data further comprises aggregating, by the one or more processing units, for the type of sensitive data, corresponding recorded respective key interfaces.

6. The method of claim 1, wherein the monitoring the data traffic flowing through its corresponding series of service nodes for each type of sensitive data further comprises:
   collecting, by the one or more processing units, for the type of sensitive data, corresponding data traffic flowing through each service node in the corresponding series of service nodes;
   encrypting, by the one or more processing units, for the type of sensitive data, the collected data traffic using a one-way algorithm; and
   storing, by the one or more processing units, for the type of sensitive data, the encrypted collected data traffic on a blockchain.

7. The method of claim 6, further comprising:
   creating, by the one or more processing units, for the type of sensitive data, a corresponding index for the encrypted collected data traffic; and
   retrieving, by the one or more processing units, for the type of sensitive data, the collected data traffic using the corresponding created index.

8. A system for tracking sensitive data in a multi-cloud environment, comprising:
   a processor; and
   a memory in communication with the processor, the memory containing program instructions that, when executed by the processor, are configured to cause the processor to perform a method, the method comprising:
   identifying, for a type of sensitive data, at least one key interface that carries the type of sensitive data;
   recording, for the type of sensitive data, the at least one key interface;
   generating, for the type of sensitive data, a series of service nodes based on the at least one key interface, wherein each service node in the series of service nodes is provided by a different cloud provider; and
   monitoring, for the type of sensitive data, corresponding data traffic flowing through each node in the corresponding series of service nodes, based on the identified at least one key interface.

9. The system of claim 8, wherein the method performed by the system further comprises identifying respective ways to process the type of sensitive data in each service node in the corresponding series of service nodes.

10. The system of claim 8, wherein the method performed by the system further comprises identifying, for the type of sensitive data, respective relationships between at least one inputting key interface and corresponding at least one key outputting interface in each service node in the corresponding series of service nodes.

11. The system of claim 8, wherein the method performed by the system further comprises identifying, for the type of sensitive data, respective data persistence status in each service node in the corresponding series of service nodes.

12. The system of claim 8, wherein the method performed by the system further comprises aggregating, for the type of sensitive data, corresponding recorded respective key interfaces.

13. The system of claim 8, wherein the method performed by the system further comprises:
   collecting, for the type of sensitive data, corresponding data traffic flowing through each service node in the corresponding series of service nodes;
   encrypting, for the type of sensitive data, the collected data traffic using a one-way algorithm; and
   storing, for the type of sensitive data, the encrypted data traffic on a blockchain.

14. The system of claim 13, wherein the processor executing the program instructions further causes the system to:
   create, for the type of sensitive data, a corresponding index for the encrypted collected data traffic; and
   retrieve, for the type of sensitive data, the collected data traffic using the corresponding created index.

15. A computer program product for tracking sensitive data in a multi-cloud environment, the computer program product comprising a computer readable storage medium having program instructions embodied therewith, the program instructions executable by a computer to cause the computer to:
   identify, for each type of sensitive data, at least one key interface that carries the type of sensitive data;
   record, for the type of sensitive data, the at least one key interface;
   generate, for each type of sensitive data, a series of service nodes based on the at least one key interface, wherein each service node in the series of service nodes is provided by a different cloud provider; and monitor, for each type of sensitive data, corresponding data traffic flowing through each node in the corresponding series of service nodes, based on the at least one key interface.

16. The computer program product of claim 15, wherein the instructions further cause the computer to identify respective ways to process the type of sensitive data in each service node in the corresponding series of service nodes.

17. The computer program product of claim 15, wherein the instructions further cause the computer to identify, for the type of sensitive data, respective relationships between at least one inputting key interface and corresponding at least one key outputting interface in each service node in the corresponding series of service nodes.

18. The computer program product of claim 15, wherein the instructions further cause the computer to aggregate, for the type of sensitive data, corresponding recorded respective key interfaces.

19. The computer program product of claim 15, wherein the instructions further cause the computer to:

collect, for the type of sensitive data, corresponding data traffic flowing through each service node in the corresponding series of service nodes;

encrypt, for the type of sensitive data, the collected data traffic using a one-way algorithm; and store, for the type of sensitive data, the encrypted collected data traffic on a blockchain.

20. The computer program product of claim 19, wherein the instructions further cause the computer to:

create, for the type of sensitive data, a corresponding index for the encrypted collected data traffic; and retrieve, for the type of sensitive data, the collected data traffic using the corresponding created index.

* * * * *